April 25, 1950          G. A. LYON          2,504,995
WHEEL COVER
Filed March 30, 1946
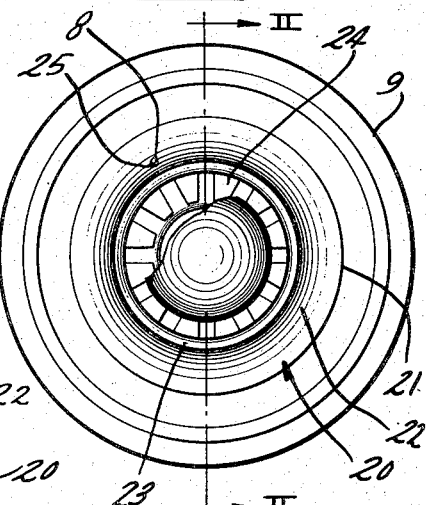
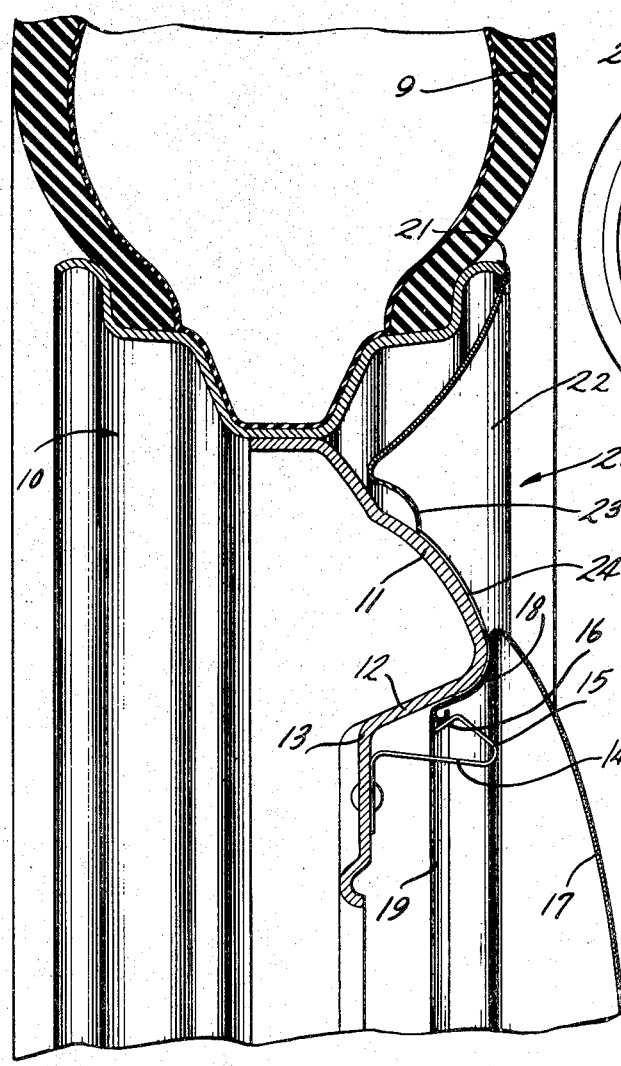
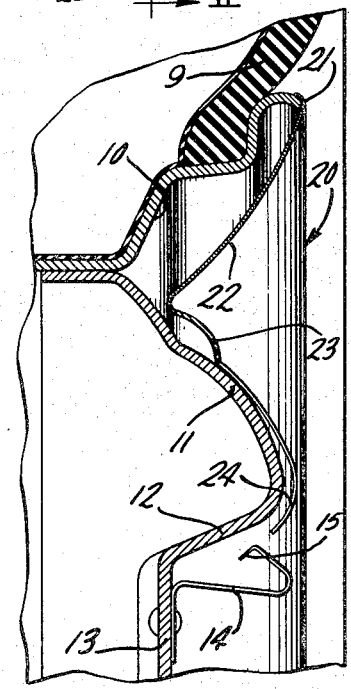
Inventor
George Albert Lyon Patented Apr. 25, 1950

2,504,995

UNITED STATES PATENT OFFICE 2,504,995

WHEEL COVER

George Albert Lyon, Allenhurst, N. J.

Application March 30, 1946, Serial No. 658,504

2 Claims. (Cl. 301—37)

This invention relates to an automobile wheel cover, and more particularly to a metallic sheet cover which will more readily accommodate allowable manufacturing tolerances in a wheel.

An object of this invention is to provide an automobile wheel cover which is adapted to have at least two spaced points of contact with different parts of the wheel and wherein, at one of the points of contact, portions of the cover are deflectable into stressed engagement with the wheel.

It should be noted that in the manufacture of automobile wheels on a large production basis considerable manufacturing tolerances are permitted as between the relative axial displacement of the tire rim and the body part. For illustration, the outermost edge of the tire rim may be displaced axially as much as one-eighth of an inch with respect to the outermost part of the body part of the wheel. This allowable tolerance complicates considerably the fitting of a metallic wheel cover to the wheel. As a consequence, in this cover provision must be made for accommodating this tolerance since otherwise the cover will not properly engage the wheel part and will have a tendency to spring off of the wheel in the use of the wheel on the road.

I aim to solve the foregoing problem in wheel covers by providing one portion of the cover with spoke-like fingers which can be resiliently deflected toward the body part into engagement therewith by a clamping hub cap used to hold the cover on the wheel. In addition, these spoke-like fingers are so positioned as to enhance the ornamentation of the wheel inasmuch as the differently colored surface of the body part is visible through the spaces separating the spokes.

In accordance with the general features of this invention there is provided in a cover structure for a wheel, including a multi-flanged tire rim part and a load bearing body part connected thereto, and having a recessed central portion in which a hub cap is detachably clamped, a circular wheel cover of sheet metal including a radially outer annular portion for disposition over outer side flanges of the rim part and engaging one of said flanges and a central cover portion provided with a plurality of radial spoke-like resilient fingers having their inner extremities deflected axially toward and into contact with the body part by the hub cap for clamping the cover to the wheel and in contact with both of the parts of the wheel.

Another feature of the invention relates to the curving of the extremities of the fingers radially and axially inwardly around the nose portion of the body part so as to telescope the central recessed portion of the body part behind the clamping hub cap.

Other objects and features of this invention will more fully appear from the following detailed description taken in connection with the accompanying drawing which illustrate a single embodiment thereof and in which Figure 1 is a side view of a wheel and cover assembly embodying the features of this invention with a portion of the hub cap broken away to show how the inner extremities of the fingers are disposed behind the hub cap;

Figure 2 is an enlarged fragmentary cross-sectional view taken on substantially the line II—II of Figure 1 looking in the direction indicated by the arrows; and Figure 3 is a cross-sectional view similar to Figure 2 with the hub cap removed and showing how the resilient spoke-like portions of the cover are out of engagement with the body part prior to the application of the hub cap thereto.

As shown on the drawings:

The reference character 9 designates generally a pneumatic tire and tube assembly, including the usual valve stem 8 (Figure 1) and which valve stem projects in the usual way through one of the side flanges of a multi-flanged drop center type of tire rim 10. This conventional tire rim 10 is carried in the usual way upon a load bearing or body part 11 which includes a depressed or recessed central portion 12 terminating in a bolt-on flange 13. This body part comprises a metallic stamping and is bulged to reinforce the same.

The bolt-on flange 13 of the body part is adapted to be fastened by any suitable means, such, for example, as cap screws or bolts (not shown) to a part on an axle. In addition, the flange 13 carries a plurality of circumferentially spaced hub cap retaining spring clips 14, which are of the so-called "inverted" type. Each of these clips includes a turned back or looped outer portion 15 terminating in a yieldable angular extremity 16 adapted to be cammingly engaged by the hub cap.

The hub cap 17 is made of sheet metal and includes an underturned skirt 18 terminating in a continuous resilient turned edge 19. This edge 19 is adapted to be cammed over the angular extremities 16 of the spring clips in a manner now well known in the art. The clips may be of any suitable number, such, for example, as three to five.

In cooperation with this wheel assembly is an annular wheel cover designated generally by the reference character 20 embracing the features of this invention. This cover has the appearance and all of the features of my previously patented covers, such, for example, as the plastic cover shown in my issued Patent No. 2,368,254, and more particularly in Figures 2 and 3 of that patent. Unlike the patented cover, however, my present cover is made of a resilient sheet metal which necessarily is not as yieldable as a plastic cover, and for that reason provision must be made in it to enable the necessary deflection of portions of the same in the clamping of the cover to the wheel. It is to this phase of the cover that my present invention is particularly directed.

The wheel cover 20 includes an outer annular tire simulating portion 22 having a turned outer edge 21 adapted to overhang and bear against an outer edge of the rim part 10 in close proximity to the side wall of the tire. The annular portion 22 extends radially and axially inwardly from the turned edge 21 to a point over the body part 11 where it is connected to a divergent annular rib portion 23 terminating in spoke-like resilient fingers 24. These radial spoke portions 24 do not have their free extremities connected together so that they are very readily deflectable in an axial direction when subjected to pressure of the detachable hub cap 17.

Normally the fingers or spokes are so located as to be spaced from the body part, as shown in Figure 3. In other words, the outer annular portion of the cover 20 makes contact at its outer edge 21 with the rim part and need not necessarily contact the body part at the nose portion of the same, so that if there is any variation in the relative location of these two wheel parts, the cover can readily accommodate the same and still have a tight fit with the wheel.

Now when the hub cap 17 is pressed axially home into retaining cooperation with the clips 14, it exerts a clamping pressure on the radially inner extremities of the spokes or fingers 24 forcing them from the position shown in Figure 3 to the body engaging position shown in Figure 2. In this manner the spokes can be clamped in resilient stressed engagement with the body part thereby enabling the cover to have a tight engagement with both the rim and body part of the wheel.

A further advantage of the spokes 24 is that portions of the differently colored body part 11 are visible through the spaces between these spokes as shown in Figure 1, which enables a very pleasing color effect. Thus the spokes not only serve a highly advantageous utilitarian purpose but in addition materially augment the ornamental effect of the cover 20.

Attention is directed to the fact that the cover 20 may be provided with an opening 25 (Figure 1) through which the valve stem 8 can project in the usual way to afford access to the valve stem.

I claim as my invention:

1. In a wheel structure including a tire rim and a load sustaining body portion having an annular intermediate nose bulge defining a dished central bolt on flange portion, a cover annulus including wing-like divergent radially outer and inner portions, the outer portion being of a dimension to substantially cover the tire rim and the inner portion being adapted to engage said nose bulge, said inner portion having the radially inner part thereof generally radially slotted and divided into a series of radially inwardly extending spoke-like fingers curved to engage over said nose bulge, and a hub cap clampingly securing said fingers to said nose bulge to retain the cover in place, the slots between the fingers extending radially outwardly substantially beyond the perimeter of the hub cap and exposing the radially outer side of the nose therethrough.

2. In a wheel structure including a tire rim and a load sustaining body portion having an annular intermediate nose bulge defining a dished central bolt-on flange portion, a cover annulus including wing-like divergent radially outer and inner portions, the outer portion being of a dimension to substantially cover the tire rim and the inner portion being adapted to engage said nose bulge, said inner portion having adjacent juncture with the outer portion a relatively narrow annular generally outwardly projecting rib, the inner portion from said rib radially inwardly having a generally radially slotted formation dividing the same into a series of radially inwardly extending spoke-like strips generally curved to engage over said nose bulge, and a hub cap clampingly securing said strips to said nose bulge to retain the cover in place, the slots between the strips extending radially outwardly substantially beyond the perimeter of the hub cap and exposing the radially outer side of the nose therethrough.

GEORGE ALBERT LYON.

REFERENCES CITED

The following references are of record in the file of this patent:

UNITED STATES PATENTS

| Number | Name | Date |
|---|---|---|
| 2,298,669 | Wood | Oct. 13, 1942 |
| 2,351,655 | Aske | June 20, 1944 |